(12) United States Patent
Yin

(10) Patent No.: US 12,500,818 B2
(45) Date of Patent: Dec. 16, 2025

(54) EFFICIENT SIMULATION OF OPTICAL EFFECTS IN OPTICAL NETWORKS

(71) Applicant: Ciena Corporation, Hanover, MD (US)

(72) Inventor: Ling Yin, Ottawa (CA)

(73) Assignee: Ciena Corporation, Hanover, MD (US)

( * ) Notice: Subject to any disclaimer, the term of this patent is extended or adjusted under 35 U.S.C. 154(b) by 126 days.

(21) Appl. No.: 18/651,793

(22) Filed: May 1, 2024

(65) Prior Publication Data

US 2025/0343735 A1   Nov. 6, 2025

(51) Int. Cl.
  *H04L 41/12*  (2022.01)
  *H04B 10/27*  (2013.01)
  *H04J 14/02*  (2006.01)
  *H04L 41/14*  (2022.01)

(52) U.S. Cl.
  CPC .......... *H04L 41/12* (2013.01); *H04J 14/0212* (2013.01); *H04L 41/145* (2013.01); *H04B 10/27* (2013.01)

(58) Field of Classification Search
  None
  See application file for complete search history.

(56) References Cited

U.S. PATENT DOCUMENTS

| | | | |
|---|---|---|---|
| 8,095,342 B2 | 1/2012 | Grigoryan et al. | |
| 8,433,192 B2 | 4/2013 | Frankel et al. | |
| 8,761,610 B2 | 6/2014 | Frankel et al. | |
| 9,357,278 B2 | 5/2016 | Swinkels et al. | |
| 9,438,369 B2 | 9/2016 | Swinkels et al. | |
| 9,491,086 B2 | 11/2016 | Trnkus et al. | |
| 9,577,763 B2 | 2/2017 | Al Sayeed et al. | |
| 9,831,947 B2 | 11/2017 | Boertjes | |
| 9,948,387 B2 | 4/2018 | Frankel et al. | |
| 9,986,317 B1 | 5/2018 | Al Sayeed et al. | |
| 10,396,892 B2 | 8/2019 | Hurley et al. | |
| 10,754,709 B2 | 8/2020 | Jain et al. | |
| 10,784,980 B2 | 9/2020 | Roberts et al. | |
| 11,356,174 B1 | 6/2022 | Golaghazadeh et al. | |
| 2015/0296279 A1* | 10/2015 | Bouda | H04J 14/0269 398/45 |
| 2020/0052787 A1* | 2/2020 | Menard | G02B 6/29395 |
| 2021/0028973 A1* | 1/2021 | Côté | G06N 3/09 |
| 2022/0360333 A1* | 11/2022 | Moore | H04B 10/0795 |
| 2023/0146640 A1 | 5/2023 | MacKay et al. | |

\* cited by examiner

*Primary Examiner* — Fadi Haj Said
(74) *Attorney, Agent, or Firm* — Baratta Law PLLC; Lawrence A. Baratta, Jr.

(57) ABSTRACT

Systems and methods include obtaining a processing graph having aggregated vertices and edges from a network graph representing an optical network, wherein one or more vertex and edge in the processing graph represents a grouping of vertices and edges from the network graph based on a given optical effect from a plurality of optical effects; and tracing the processing graph to perform a simulation of one or more optical effects of the plurality of optical effects. Prior to the obtaining, the systems and methods can include forming the network graph based on a topology of the optical network, wherein each vertex in the network graph represent an optical effect in a given component in the optical network and each edge represents propagation between components; tracing the network graph to determine a type and a sequence number; and forming the processing graph based on the traced network graph.

14 Claims, 9 Drawing Sheets

EFFICIENT SIMULATION OF OPTICAL EFFECTS IN OPTICAL NETWORKS

FIELD OF THE DISCLOSURE

The present disclosure relates generally to optical networking. More particularly, the present disclosure relates to systems and methods for batch processing to provide efficient simulation of optical effects, e.g., optical power, Optical Signal-to-Noise Ratio (OSNR), etc., in optical networks.

BACKGROUND OF THE DISCLOSURE

Optical networks include one or more Dense Wave Division Multiplexing (DWDM) channels that propagate over optical fiber between terminals, e.g., Reconfigurable Optical Add/Drop Multiplexers (ROADMs). An Optical Multiplex Section (OMS) or simply an optical section includes an all-optical link that may be a single span as well as multiple spans with intermediate line amplifiers. Of course, practical embodiments can include multiple sections, in a mesh topology, etc. Also, a given channel can propagate across multiple sections by passing through at intermediate ROADMs. In optical network design, planning, and engineering, there is a need to perform simulations to determine optical effects, e.g., optical power, OSNR, etc., to ensure a proposed design will work, to determine how to engineer a given configuration, etc. To that end, there exists optical network simulation tools which calculate various aspects associated with optical effects, optical engineering, etc., such as OSNR, margin, optical power, dispersion, etc. Existing tools generally perform such computations in a scalar-based, sequential manner, which has high latency (i.e., takes a while to provide a result such as on the order of seconds) and does not scale as the sizes of the optical network grow (i.e., is slower as the network scales). These existing tools also are not adapted well to High Performance Computing (HPC) techniques, such as with Graphics Processing Units (GPU) and Accelerated Processing Units (APU).

BRIEF SUMMARY OF THE DISCLOSURE

The present disclosure relates to systems and methods for batch processing to provide efficient simulation of optical effects, e.g., optical power, OSNR, etc., in optical networks. The present disclosure includes an efficient approach to simulate optical effects in real-time, for large networks, such as in milliseconds. In particular, the present disclosure includes a directed graph representation of the optical network, also referred to herein as a network graph, with optical effects being modeled in vertices and with the directed edges representing ideal propagation of light (since the optical effects are addressed at each vertex). Based on the network graph, it is possible to perform parallel computation of independent operations and to perform batch processing, i.e., all channels are addressed simultaneously. This leads to a solution that provides faster results (milliseconds versus seconds) as well as results for multiple queries (batches) simultaneously.

In various embodiments, the present disclosure includes a method having steps, a processing system configured to implement the steps, and a non-transitory computer-readable medium storing instructions that, when executed, cause one or more processors to implement the steps. The steps include obtaining a processing graph having aggregated vertices and edges from a network graph representing an optical network, wherein one or more vertex and edge in the processing graph represents a grouping of vertices and edges from the network graph based on a given optical effect from a plurality of optical effects; and tracing the processing graph to perform a simulation of one or more optical effects of the plurality of optical effects.

The steps can further include, prior to the obtaining, forming the network graph based on a topology of the optical network, wherein each vertex in the network graph represents an optical effect in a given component in the optical network and each edge represents propagation between components; tracing the network graph to determine a type and a sequence number; and forming the processing graph based on the traced network graph. The components can include any of multiplexers/demultiplexers, amplifiers, Wavelength Selective Switches (WSSs), and fibers.

Each vertex in the network graph can represent a specific optical effect of the plurality of optical effects, and each edge in the network graph represents an idealized propagation of light between adjacent vertices since the specific optical effect is model at the vertices. The plurality of optical effects can include any of multipath interference, gain tilt, gain, attenuation, Stimulated Raman Scattering. The simulation can be for all of the plurality of optical effects and the tracing concurrently performs the simulation for all of the plurality of optical effects. For the tracing, any disconnected vertices in the processing graph can be processed independently.

BRIEF DESCRIPTION OF THE DRAWINGS

The present disclosure is detailed through various drawings, where like components or steps are indicated by identical reference numbers for clarity and consistency.

DETAILED DESCRIPTION OF THE DISCLOSURE

Again, the present disclosure relates to systems and methods for batch processing to provide efficient simulation of optical effects, e.g., optical power, OSNR, etc., in optical networks. In particular, the present disclosure includes:

(1) A pre-built static network graph used in a simulation for solving the processing dependency ahead-of-time, for reduced latency through minimizing runtime overhead.

(2) Batch processing of homogeneous operations providing reduced latency and increased scalability through minimizing runtime overhead and maximizing parallelism.

(3) Parallel processing of heterogeneous operations for reduced latency.

Example Optical Network

Figure 1:
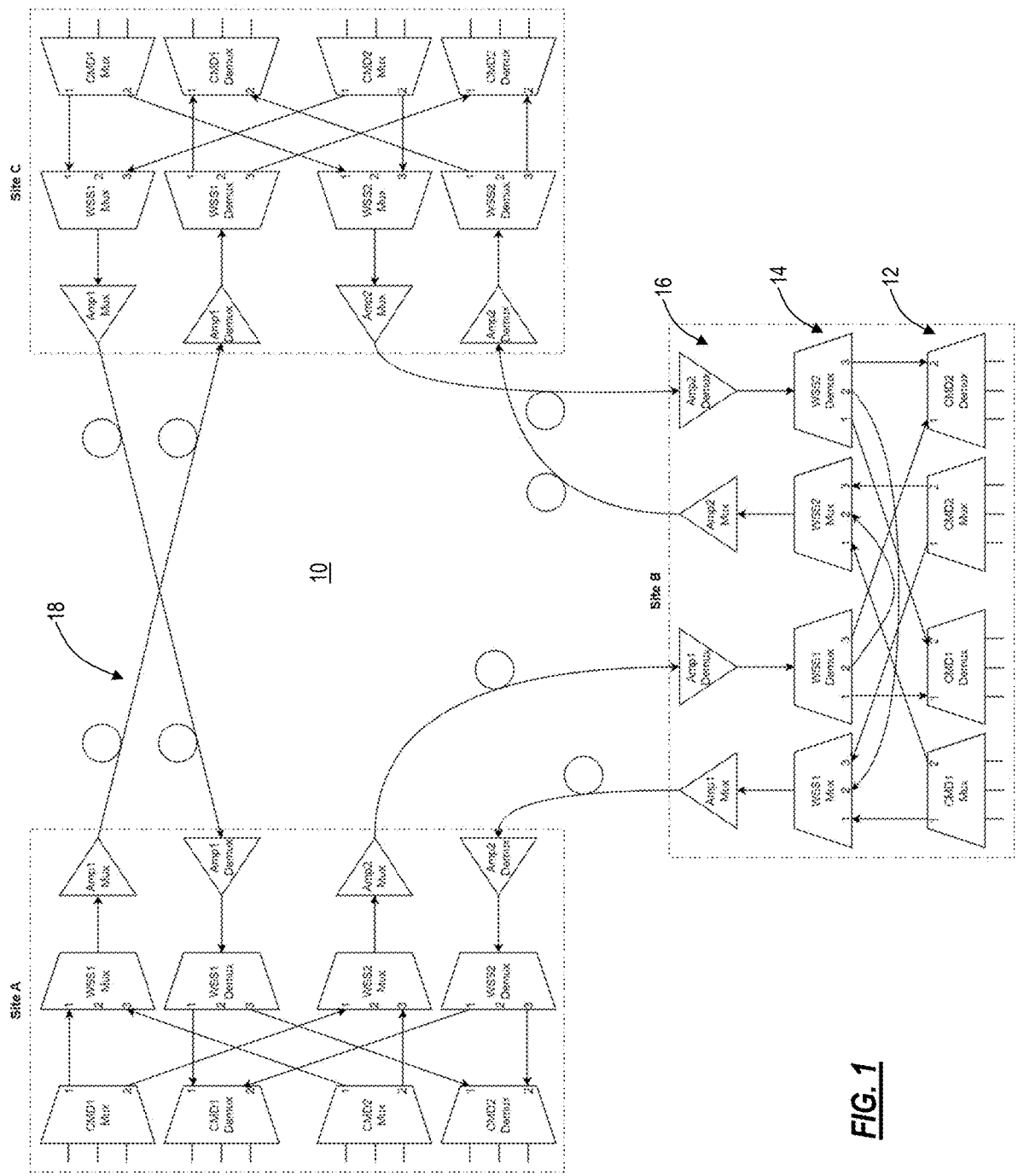
FIG. 1 is a network diagram of an example optical network of three sites A, B, C, and with example optical modules.

FIG. 1 is a network diagram of an example optical network 10 of three sites A, B, C, and with example optical modules 12, 14, 16. Those skilled in the art will appreciate the FIG. 1 is a common representation of a network at the optical module level. That is, the optical network 10 is physically realized with optical devices which are referred to herein as the optical modules 12, 14, 16. The optical modules 12, 14, 16 are components in the optical network 10 and can be modeled in the network graph. While the term modules is used herein, those skilled in the art will recognize any physical implementation is contemplated, e.g., components may be combined in a single module, broken up across multiple modules, implemented in a single chassis or rack unit, etc. Also, the optical network 10 in FIG. 1 is shown with only three example modules 12, 14, 16, namely a multiplexer/demultiplexer 12 (labeled as a CMD—channel multiplexer/demultiplexer), a Wavelength Selective Switch (WSS) 14 (which includes a multiplexer and demultiplexer), and amplifiers 16.

These components also have a direction component as optical channels are transmitted and received. That is, a channel is transmitted from a CMD multiplexer to a WSS multiplexer and to a post amplifier, and then received at a pre amplifier, WSS demultiplexer, and CMD demultiplexer. Those skilled in the art will appreciate the modules 12, 14, 16 are example components and there can be others. To simplify the illustration, let's assume the optical modules 12, 14, 16 only contain nominal optical components, i.e., a CMD 12 only contains multiplexing/demultiplexing components unlike a production module that may contain amplifiers, so that we do not need to further break down the modules into simulation components. Of course, those skilled in the art will appreciate the network graph can be expanded to include multiple functions in a single module, but the present disclosure focused on a single function in each module 12, 14, 16 for simplicity of illustration.

The network graph is used to model optical effects. Also, let's simplify the optical effects to nominal ones to simplify the description. Of course, those skilled in the art appreciate complex optical effects can be modeled in the network graph. The simplified optical effects include:
(1) amplified effects for the amplifiers 16,
(2) WSS mux/demux effects for the WSS 14,
(3) CMD mux/demux effects for the CMD 12, and
(4) fiber effects for line fibers 16.
where each nominal effect may contain one or more optical effects, such as, e.g., multipath interference, gain tilt, attenuation, Stimulated Raman Scattering (SRS), etc. It is these values that are modeled in the network graph for modeling thereof.

Network Graph

Figure 2:
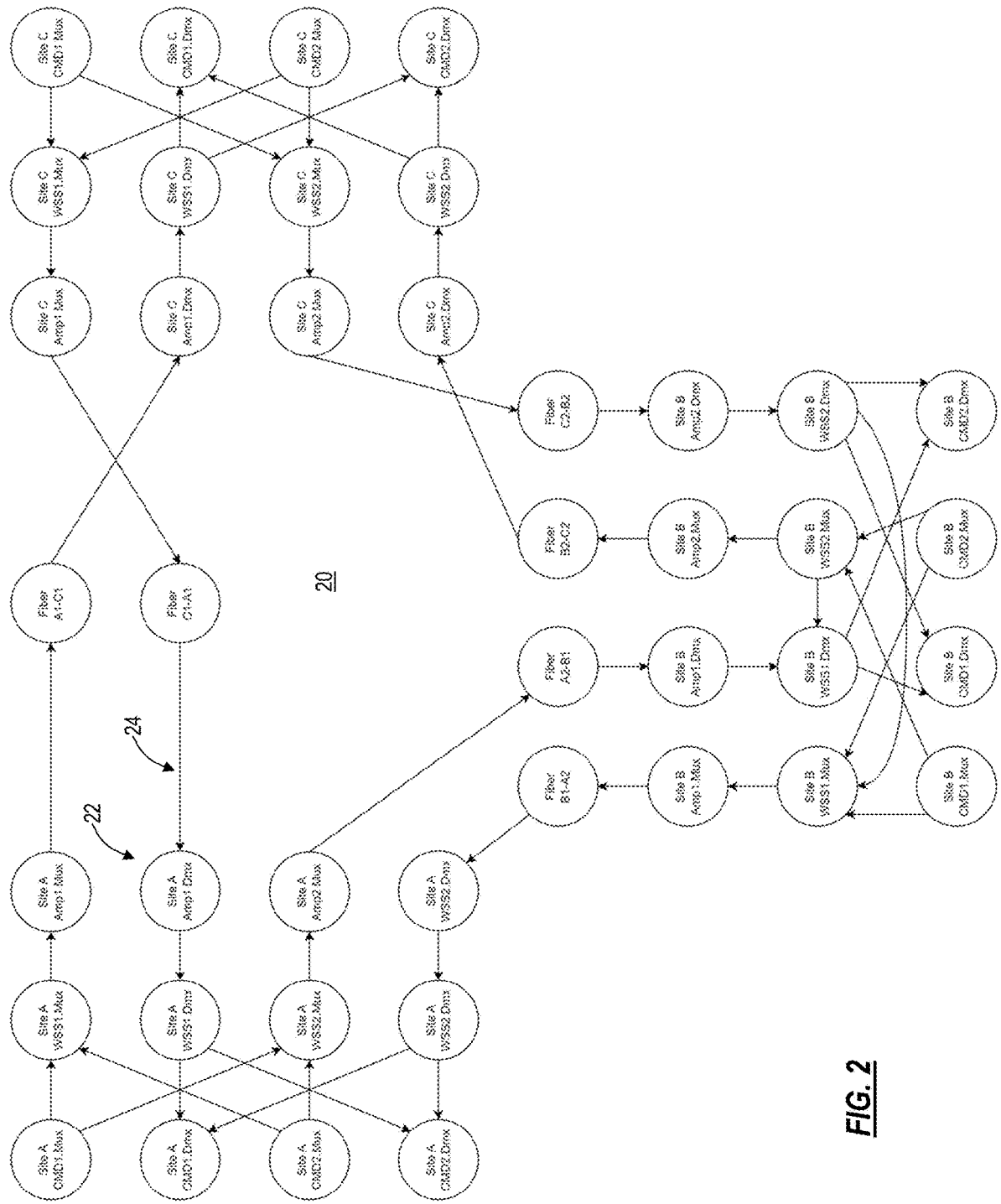
FIG. 2 is a diagram of a network graph for the optical network of FIG. 1 with vertices representing the modules, and edges representing both the line fibers and connectivity of the modules at the sites A, B, C.

FIG. 2 is a diagram of a network graph 20 for the optical network 10 with vertices 22 representing the modules 12, 14, 16, and edges 24 representing both the line fibers 18 and connectivity of the modules 12, 14, 16 at the sites A, B, C. The network graph 10 is the topology of all possible light propagation paths in a directed simple graph. Each vertex 22 in the graph 20 represents an optical effect. Each directed edge 24 in the graph represents an ideal propagation of the light.

In particular, the present disclosure uses the network graph 20 to more efficiently process the simulation of optical effects in DWDM networks on contemporary processing units. The network graph 20 represents the topology of the optical network 10 with all possible light propagation paths in a directed simple graph. Again, each vertex 22 in the graph 20 represents an optical effect that needs to be simulated according to the corresponding optical component (e.g., grating effect from multiplexers/demultiplexers, gain and ripple effect from gain blocks, SRS effect from fibers or Raman amplifiers, and the like). Each directed edge 24 in the graph 20 represents an ideal propagation of the light (effectless, because any effect from the propagation is already modeled as a vertex 22). Once the graph 20 is created to model the optical effects, tracing the network graph 20 provides an algorithmic way to mark the vertices 22 so that the vertices 22 and edges 24 can be easily aggregated when generating the processing graph next.

Figure 3:
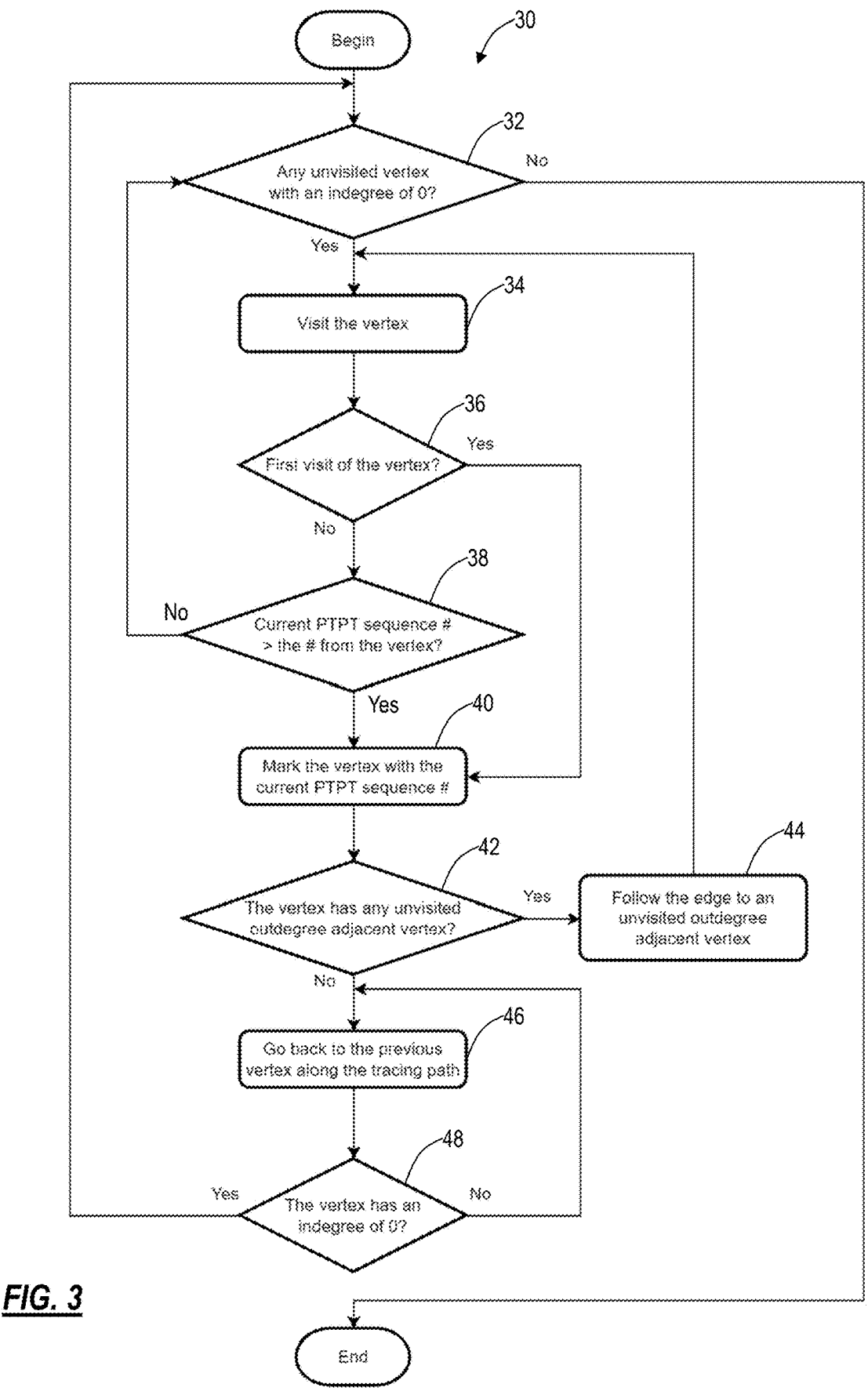
FIG. 3 is a flowchart of a process for tracing the network graph.

FIG. 3 is a flowchart of a process 30 for tracing the network graph 20. The process 30 is a straightforward implementation with singe-threaded depth-first traversal algorithm for directed graph, for marking the vertices. The process 30 begins and checks if there is any unvisited vertex with indegree of 0 (step 32), and, if so, the process 30 ends when there is no unvisited vertex with indegree 0. Otherwise, the process 30 includes visiting the vertex (step 34). Of note, indegree in a directed graph means the number of edges coming into a vertex, and a vertex with indegree 0 is a starting point.

After step 34, the process 30 checks if this is a first visit of the vertex (step 36). If not (step 36), the process 30 checks a current Per-Tracing and Per-Type (PTPT) sequence number versus a sequence number from the vertex (step 38). PTPT stands for Per-Tracing and Per-Type, where the "tracing" is the visit of vertices that starts from a vertex with an indegree of 0, and the "type" is the type of optical effect carried by the vertex. This enables the vertex to be visited multiple times for different optical effects.

If this is the first visit of the vertex (step 36) or after the PTPT sequence number is equal to the sequence number from the vertex (step 38) (all optical effects have been accounted for), the process 30 marks the vertex with the current PTPT sequence number (step 40). The process 40 checks if any vertices have any unvisited outdegree adjacent vertices (step 42), and, if so, follows the edge to an unvisited outdegree adjacent vertex (step 44). If there are no unvisited outdegree adjacent vertices (step 42), the process 40 goes back to a previous vertex along the tracing path (step 46). The process 40 continued until it reaches a vertex of outdegree 0 (step 48).

The process 40 is tracing the network graph from each vertex that has an indegree of 0 and marking the vertices with sequence numbers based on the order they are encountered during the tracing per optical effect (equivalent to the number of the same type of optical effect encountered along the linear path from the vertex where the current tracing started to the current vertex, referred to hereinafter as PTPT—Per-Tracing and Per-Type—sequence number). Any disconnected vertices can be traced independently (parallelizable).

Here is another a straightforward depth-first implementation of the tracing:
(1) Visit the vertex:
  (a) If the vertex is first-time visited in the scope of all possible tracing traversal: Mark the vertex with the current PTPT sequence number.

(b) If the vertex has already been visited:
  If the current PTPT sequence number is less than or equal to the number marked on the vertex, stop the current tracing.
  If the current PTPT sequence number is greater than the number marked on the current vertex, continue the current tracing (equivalent to updating the number carried by the vertex recursively).
(2) Follow each outdegree edge of the vertex and perform step 1 on each outdegree independently.

Those skilled in the art will appreciate there are other graph traversal algorithms (parallel, breadth-first, etc.) that can be used to generate the equivalent marking. Practically a parallel depth-first could be used for a balanced performance and implementation simplicity. All of these implementations are contemplated herewith. That is, the present disclosure contemplates various traversal approaches.

Figure 4:
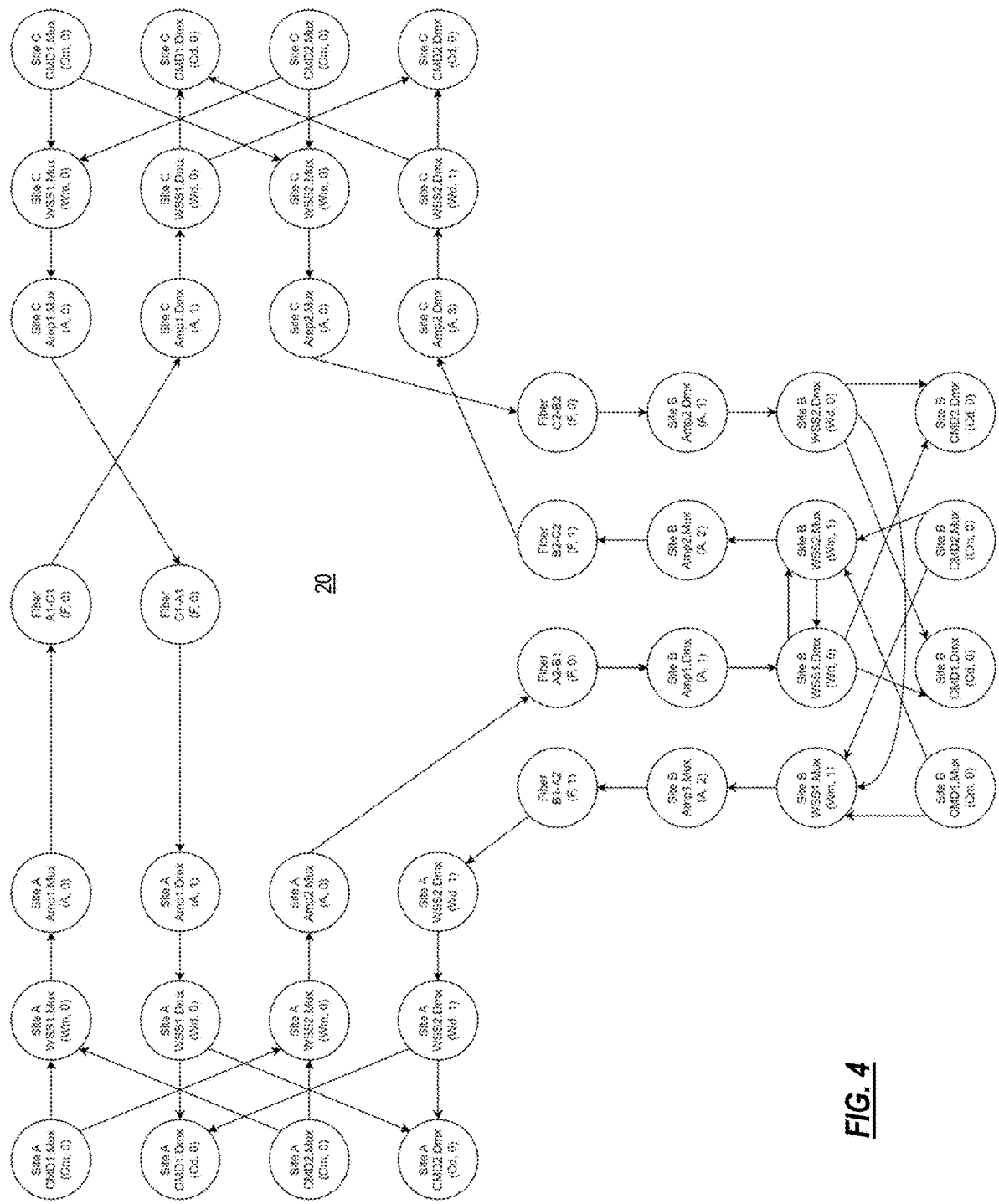
FIG. 4 is the network graph with the vertices being annotated to show a tracing result.

FIG. 4 is the network graph 20 with the vertices 22 being annotated to show a tracing result. For illustration simplicity, the following type notations are used for each nominal optical effects:
  (1) A—amp effect
  (2) Cm/Cd—CMD mux/demux effect
  (3) F—fiber effect
  (4) Wm/Wd—WSS mux/demux effect The annotated network shown contains the tracing result. The corresponding type notation and the PTPT sequence number are annotated as a tuple on each vertex in the network graph 20.

Processing Graph

Figure 5:
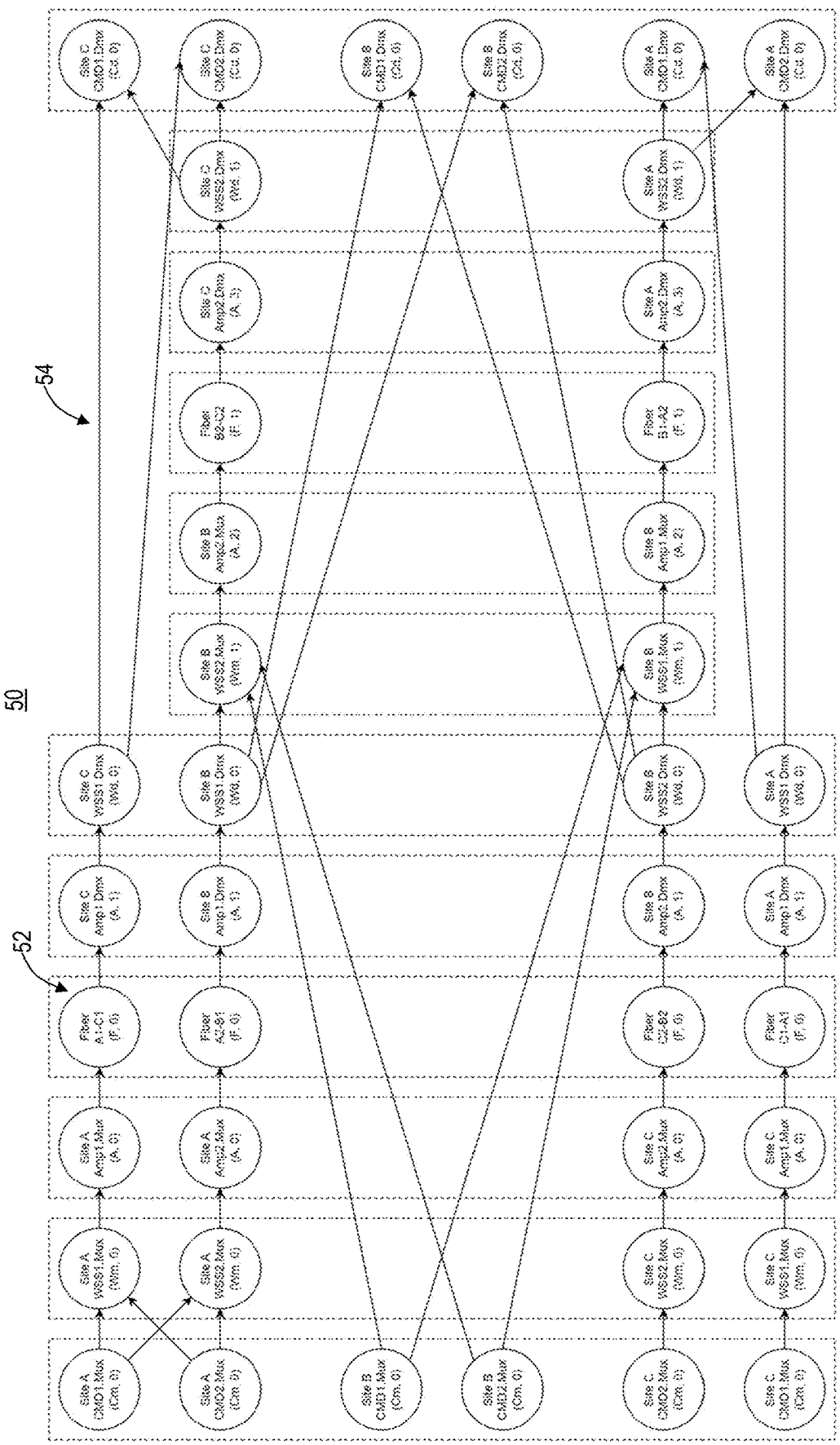
FIG. 5 is a diagram of a processing graph where vertices in the network graph are grouped according to their type of optical effects and marked numbers.

FIG. 5 is a diagram of a processing graph 50 where vertices 22 in the network graph 20 are grouped according to their type of optical effects and marked numbers. The processing graph 50 is a respective aggregation of optical effects and light propagation paths as a directed simple graph:
  (1) Each vertex 52 in the graph 50 represents a grouping of vertices 22 from the network graph 20 that carry the same type of optical effects and the same number.
  (2) Each directed edge 54 in the graph 52 represents an aggregation of directed edges 24 from the source group of vertices to the destination group of vertices in the network graph 20.

The original connectivity information of vertices from the network graph within the processing graph should be maintained (e.g. embedded into the processing graph or made referenceable using information from the processing graph).

The value of the processing graph 50 is that it allowed parallelization. So, the network graph 20 is created and traced, and then converted to the processing graph 50. Then, the processing graph 50 can be traced to model simulation of multiple optical effects simultaneously. The processing the simulation of optical effects starts from each vertex 52 that has an indegree of 0 in the processing graph 50. Advantageously, any disconnected vertices can be processed independently (parallelizable/pipelinable).

A processing approach can include:
  (a) Process the vertex only if all its indegree adjacent vertices are processed.
  (b) Follow each outdegree edge of the vertex:
    (1) Pass the output data from processing the current vertex into each outdegree adjacent vertex with layout mapping according to the original connectivity information of vertices from the network graph that is either embedded into or referenceable from the processing graph.
    (2) Perform step (a).

Figure 6:
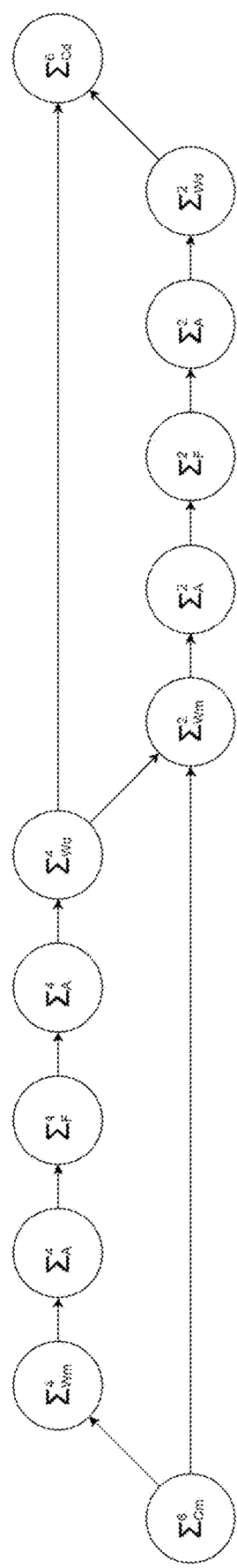
FIG. 6 is a diagram of a logical view of the processing graph.

FIG. 6 is a diagram of a logical view of the processing graph 50 from tracing the network graph 20. In FIG. 6,
  (1) $\Sigma$ indicates batching.
  (2) The superscripted number indicates the batch size.
  (3) The subscripted alphabetic notation indicates the optical effect.

The processing graph generally does not have disconnected sub-graphs unless the network 10 has two isolated sub-network with non-overlapping optical effects (unlikely). For the processing graph of the example network, the simulation is processed linearly according to the dependency from light propagation, such as described in the following table:

| Stage | Optical Effect | Batch # | Size | Components |
|---|---|---|---|---|
| 1 | CMD Mux (Cm) | 0 | 6 | A.CMD1.Mux, A.CMD2.Mux, B.CMD1.Mux, B.CMD2.Mux, C.CMD1.Mux, C.CMD2.Mux |
| 2 | WSS Mux (Wm) | 0 | 4 | A.WSS1.Mux, A.WSS2.Mux, C.WSS1.Mux, C.WSS2.Mux |
| 3 | Amplifier (A) | 0 | 4 | A.Amp1.Mux, A.Amp2.Mux, C.Amp1.Mux, C.Amp2.Mux |
| 4 | Fiber (F) | 0 | 4 | A1-C1, A2-B1, C2-B2, C1-A1 |
| 5 | Amplifier (A) | 1 | 4 | A.Amp1.Demux, B.Amp1.Demux, B.Amp2.Demux, C.Amp1.Demux |
| 6 | WSS Demux (Wd) | 0 | 4 | A.WSS1.Demux, B.WSS1.Demux, B.WSS2.Demux, C.WSS1.Demux |
| 7 | WSS Mux (Wm) | 1 | 2 | B.WSS1.Mux, B.WSS2.Mux |
| 8 | Amplifier (A) | 2 | 2 | B.Amp1.Mux, B.Amp2.Mux |
| 9 | Fiber (F) | 1 | 2 | B1-C1, B2-C2 |
| 10 | Amplifier (A) | 3 | 2 | A.Amp2.Demux, C.Amp2.Demux |
| 11 | WSS Demux (Wd) | 1 | 2 | A.WSS2.Demux, C.WSS2.Demux |
| 12 | CMD Demux (Cd) | 0 | 6 | A.CMD1.Demux, A.CMD2.Demux, B.CMD1.Demux, B.CMD2.Demux, C.CMD1.Demux, C.CMD2.Demux |

Batch Processing

Figure 7:
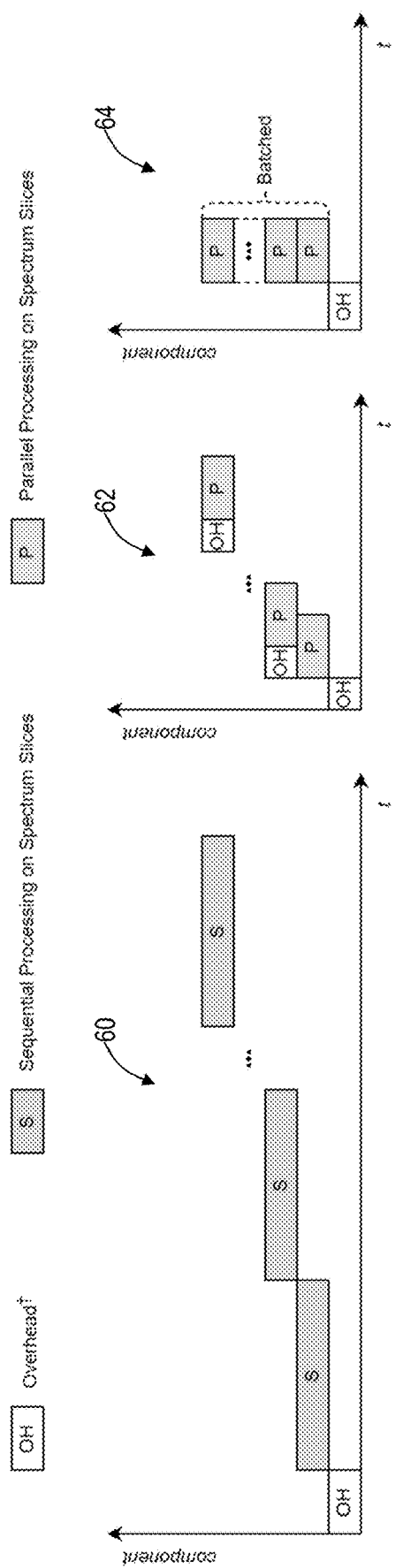
FIG. 7 is graphs illustrating timelines to highlight a benefit of the present disclosure.

FIG. 7 is graphs 60, 62, 64 illustrating timelines to highlight a benefit of the present disclosure. The graph 60 is the existing approach with no ability to pipeline or parallelize the simulation. The graph 62 shows an ability to pipeline in the existing approach. Finally, the graph 64 illustrates the proposed batch processing with the processing graph 50 where all optical effects are computed at the same time based on the aggregation.

Batch processing is important here for latency reduction and performance improvement because:
  (1) It reduces runtime overhead from setting up and cleaning up the computing environment (e.g., Single-Instruction-Multiple-Data (SIMD) stream, compute kernel, etc.) for individual simulation components.
  (2) It increases parallelism by maximizing the utilization of parallel computational resources.

Process

Figure 8:
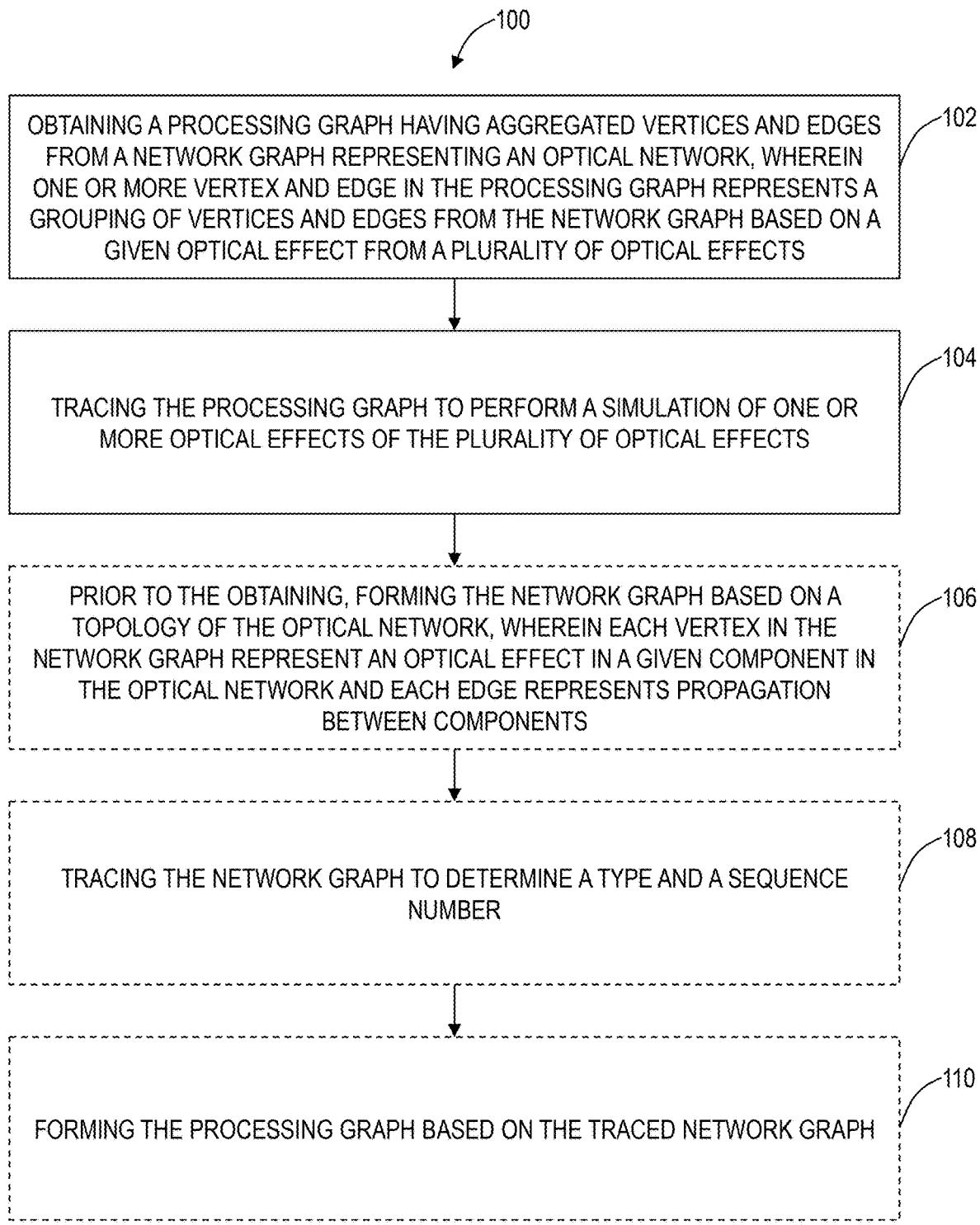
FIG. 8 is a flowchart of a process for batch processing to provide efficient simulation of optical effects.

FIG. 8 is a flowchart of a process 100 for batch processing to provide efficient simulation of optical effects. The process 100 contemplates implementation as a method having steps, as a processing device or service configured to implement the steps, and as a non-transitory computer readable medium storing instructions that, when executed, cause one or more processors to execute the steps. The process 100 leverages the network graph 20 to form the processing graph 50 which in turn can be traversed to simulate multiple optical effects in parallel (batch).

The process 100 has three general aspects—

(1) The pre-built static processing graph for simulation by solving the processing dependency ahead-of-time for reduced latency through minimizing runtime overhead. In most simulation scenarios, the network 10 is static (e.g., a predefined network that does not change during simulation), which makes it possible to perform the actions of (i) representing the optical network 10 as the network graph 20 (FIG. 2), (ii) tracing the network graph 20 for each optical effect (FIGS. 3-4), and (iii) generating the processing graph 50 from the traced network graph 20 (FIGS. 5-6) ahead of time, offline. The last action (iv) processing the simulation according to processing graph—is required during run-time, thus minimizing the computational overhead from dependency solving.

(2) Batch processing of homogeneous operations for reduced latency and increased scalability through minimizing runtime overhead and maximizing parallelism—

The processing of a vertex from the processing graph 50 is actually the processing of independent optical effects of the same type, which allows batch processing where the computational micro-environment—compute kernel from OpenCL/CPU/GPU, SIMD (Single-Instruction-Multiple-Data) stream from CPU—only needs to be setup and cleaned up at most once for multiple homogeneous operations, thus minimizing the runtime overhead from handling the computational micro-environment that could be more costly than a single operation to achieve a lower latency.

A batch of independent homogeneous operations is very suitable for processing on contemporary HPC (High-Performance Computing) hardware such as general-purpose GPU (Graphics Processing Unit) and APU (Accelerated Processing Unit). Such batch processed in parallel further reduces latency in general and increases scalability for high-degree networks.

(3) Parallel processing of heterogeneous operations for reduced latency. The processing of disconnected vertices from the processing graph can be performed in parallel to further reduce latency when hardware resource permits.

The process 100 includes obtaining a processing graph having aggregated vertices and edges from a network graph representing an optical network, wherein one or more vertex and edge in the processing graph represents a grouping of vertices and edges from the network graph based on a given optical effect from a plurality of optical effects (step 102); and tracing the processing graph to perform a simulation of one or more optical effects of the plurality of optical effects (step 104).

The process 100 can further include, prior to the obtaining, forming the network graph based on a topology of the optical network, wherein each vertex in the network graph represent an optical effect in a given component in the optical network and each edge represents propagation between components (step 106); tracing the network graph to determine a type and a sequence number (step 108); and forming the processing graph based on the traced network graph (step 110). The components can include, e.g., any of multiplexers/demultiplexers, amplifiers, and Wavelength Selective Switches (WSSs). Each vertex in the network graph can represent a specific optical effect of the plurality of optical effects, and each edge in the network graph represents an idealized propagation of light between adjacent vertices since the specific optical effect is model at the vertices.

The plurality of optical effects can include, e.g., any of multipath interference, gain tilt, gain, attenuation, Stimulated Raman Scattering. The simulation can be for all of the plurality of optical effects and the tracing concurrently performs the simulation for all of the plurality of optical effects. For the tracing, any disconnected vertices in the processing graph can be processed independently.

Processing System

Figure 9:
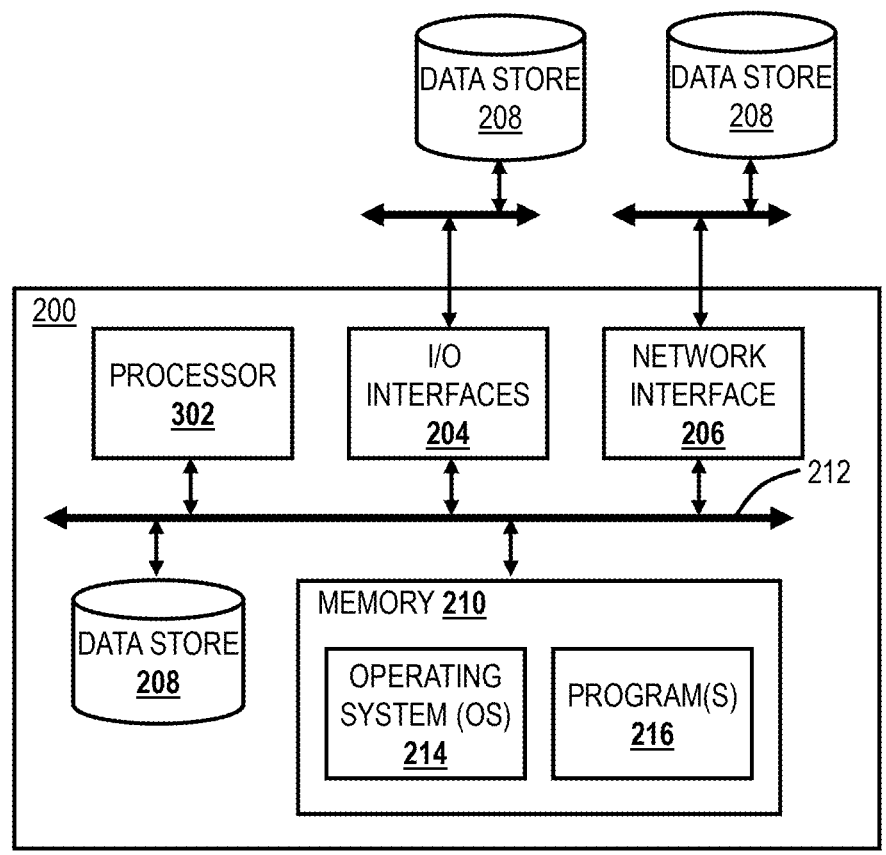
FIG. 9 is a block diagram of a processing system.

FIG. 9 is a block diagram of a processing system 200. The processing system 200 can implement a network management system, planning system, controller, etc. that is configured to implement the process 100. Also, one or more servers 200 can be configured together to form a cluster or some other grouping of compute resources configured to implement the process 100, such as Software-as-a-Service (SaaS), via the cloud, etc. The processing system 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 9 depicts the processing system 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing system 200, a semiconductor-based microprocessor (in the form of a microchip or chipset), or generally any device for executing software instructions. When the processing system 200 is in operation, the processor 202 is configured to execute software stored within the memory 210, to communicate data to and from the memory 210, and to generally control operations of the processing system 200 pursuant to the software instructions. The I/O interfaces 204 may be used to receive user input from and/or for providing system output to one or more devices or components.

The network interface 206 may be used to enable the processing system 200 to communicate on a network. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the processing system 200, such as, for example, an internal hard drive connected to the local interface 212 in the processing system 200. Additionally, in another embodiment, the data store 208 may be located external to the processing system 200 such as, for example, an external hard drive connected to the I/O interfaces 204 (e.g., SCSI or USB connection). In a further embodiment, the data store 208 may be connected to the processing system 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Benefits

Advantageously, the present disclosure makes it possible to simulate optical network power levels in real-time for large networks.

In an embodiment, a simulation as performed that implements launch power level simulation includes the simulation of amplifier tilt, Virtual Optical Spectrum Analyzer based fiber propagation model, and SRS effect. It provided sub-millisecond full-network simulation for a linear network with 50+ bi-directional line amplifier in both C and L bands (with a resolution of thousands of spectrum slices) with profiler enabled on a contemporary desktop GPU, which is several times faster than a contemporary desktop CPU (sub-10 milliseconds). It provided sub-10 milliseconds full-network simulation for a 10-degree star network with 50 bi-directional line amplifier on each degree in both C and L bands (with a resolution of thousands spectrum slices) with profiler enabled on the same contemporary desktop GPU.

This also significantly reduces power consumption: The proposed solution is easily implementable in its efficient nature on GPUs and other High-Performance Computing hardware. A contemporary GPU is expected to be around 10 times more efficient per watt on average for highly parallel computations. Further reduction in power consumption can be achieved by providing Simulation-as-a-Service to the users so that specially configured hardware with higher efficiency can be used in a high-utilization environment that avoids idling.

CONCLUSION

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. Additionally, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

What is claimed is:

1. A non-transitory computer-readable storage medium comprising instructions that, when executed, cause one or more processors to perform steps of:

forming a network graph based on a topology of an optical network, wherein each vertex in the network graph represents an optical effect in a given component in the optical network and each edge represents propagation between components;

tracing the network graph to determine a type and a sequence number;

forming a processing graph based on the traced network graph, wherein the components include at least one or more of multiplexers/demultiplexers, amplifiers, Wavelength Selective Switches (WSSs), and fibers;

obtaining the processing graph, wherein one or more vertex and edge in the processing graph represents a grouping of vertices and edges from the network graph based on a given optical effect from a plurality of optical effects; and tracing the processing graph to perform a simulation of one or more optical effects of the plurality of optical effects, wherein the forming of the processing graph and the tracing of the processing graph reduces latency in simulating the optical effect.

2. The non-transitory computer-readable storage medium of claim 1, wherein each vertex in the network graph represents a specific optical effect of the plurality of optical effects, and each edge in the network graph represents an idealized propagation of light between adjacent vertices, wherein the specific optical effect is modeled at the vertices.

3. The non-transitory computer-readable storage medium of claim 1, wherein the plurality of optical effects include at least one or more of multipath interference, gain tilt, gain, attenuation, Stimulated Raman Scattering.

4. The non-transitory computer-readable storage medium of claim 1, wherein the simulation is for all of the plurality of optical effects and the tracing performs the simulation for all of the plurality of optical effects.

5. The non-transitory computer-readable storage medium of claim 1, wherein, for the tracing, any disconnected vertices in the processing graph are processed in parallel.

6. A method comprising steps of:

forming a network graph based on a topology of an optical network, wherein each vertex in the network graph represents an optical effect in a given component in the optical network and each edge represents propagation between components;

tracing the network graph to determine a type and a sequence number;

forming a processing graph based on the traced network graph, wherein the components include at least one or more of multiplexers/demultiplexers, amplifiers, Wavelength Selective Switches (WSSs), and fibers;

obtaining the processing graph, wherein one or more vertex and edge in the processing graph represents a grouping of vertices and edges from the network graph based on a given optical effect from a plurality of optical effects; and tracing the processing graph to perform a simulation of one or more optical effects of the plurality of optical effects, wherein the forming of the processing graph and the tracing of the processing graph reduces latency in simulating the optical effect.

7. The method of claim 6, wherein each vertex in the network graph represents a specific optical effect of the plurality of optical effects, and each edge in the network graph represents an idealized propagation of light between adjacent vertices, wherein the specific optical effect is modeled at the vertices.

8. The method of claim 6, wherein the plurality of optical effects include at least one or more of multipath interference, gain tilt, gain, attenuation, Stimulated Raman Scattering.

9. The method of claim 6, wherein the simulation is for all of the plurality of optical effects and the tracing performs the simulation for all of the plurality of optical effects.

10. The method of claim 6, wherein, for the tracing, any disconnected vertices in the processing graph are processed in parallel.

11. A processing system comprising: one or more processors; and memory storing instructions that, when executed, cause the one or more processors to form a network graph based on a topology of an optical network, wherein each vertex in the network graph represents an optical effect in a given component in the optical network and each edge represents propagation between components;

trace the network graph to determine a type and a sequence number;

form a processing graph based on the traced network graph, wherein the components include at least one or more of multiplexers/demultiplexers, amplifiers, Wavelength Selective Switches (WSSs), and fibers;

obtain the processing graph, wherein one or more vertex and edge in the processing graph represents a grouping of vertices and edges from the network graph based on a given optical effect from a plurality of optical effects; and trace the processing graph to perform a simulation of one or more optical effects of the plurality of optical effects, wherein the forming of the processing graph and the tracing of the processing graph reduces latency in simulating the optical effect.

12. The processing system of claim 11, wherein the plurality of optical effects include at least one or more of multipath interference, gain tilt, gain, attenuation, Stimulated Raman Scattering.

13. The processing system of claim 11, wherein the simulation is for all of the plurality of optical effects and the tracing performs the simulation for all of the plurality of optical effects.

14. The processing system of claim 11, wherein, for the tracing, any disconnected vertices in the processing graph are processed in parallel.

* * * * *